(12) United States Patent
Geddis

(10) Patent No.: US 9,834,039 B2
(45) Date of Patent: Dec. 5, 2017

(54) 2-CHAMBER TIRE PRESSURE TUNING SYSTEM

(71) Applicant: Brian Geddis, Hood River, OR (US)

(72) Inventor: Brian Geddis, Hood River, OR (US)

( * ) Notice: Subject to any disclaimer, the term of this patent is extended or adjusted under 35 U.S.C. 154(b) by 248 days.

(21) Appl. No.: 14/599,400

(22) Filed: Jan. 16, 2015

(65) Prior Publication Data

US 2016/0207355 A1    Jul. 21, 2016

(51) Int. Cl.
| | |
|---|---|
| B60C 5/22 | (2006.01) |
| B60C 17/06 | (2006.01) |
| B60C 13/00 | (2006.01) |
| B60C 29/00 | (2006.01) |
| B60C 17/00 | (2006.01) |

(52) U.S. Cl.
CPC ............... *B60C 5/22* (2013.01); *B60C 13/00* (2013.01); *B60C 17/0009* (2013.01); *B60C 17/065* (2013.01); *B60C 29/007* (2013.01); *B60C 2017/0081* (2013.01)

(58) Field of Classification Search
CPC .. B60C 5/08; B60C 5/02; B60C 5/025; B60C 5/04; B60C 5/10; B60C 5/20; B60C 5/22; B60C 29/007; B60C 13/009; B60C 13/00; B60C 29/04; B60C 17/00; B60C 2017/0081; B60C 17/04; B60C 17/044; B60C 17/06; B60C 2017/063; B60C 17/065
USPC ............. 152/450, 415–426, 509–512, 339.1, 152/340.1, 341.1, 342.1, 343.1, 344.1, 152/345.1, 501, DIG. 16, 325, 155, 157, 152/158
See application file for complete search history.

(56) References Cited

U.S. PATENT DOCUMENTS

| | | | | |
|---|---|---|---|---|
| 640,851 | A * | 1/1900 | Ancora | B60C 19/12 152/192 |
| 1,279,694 | A * | 9/1918 | Hofmeister | B60C 19/122 152/157 |
| 2,237,245 | A * | 4/1941 | Wilson | B29C 73/20 152/313 |
| 2,713,371 | A | 7/1955 | King et al. | |
| 2,754,875 | A * | 7/1956 | King | B60C 17/01 137/223 |

(Continued)

FOREIGN PATENT DOCUMENTS

| | | |
|---|---|---|
| EP | 2173572 | 4/2010 |
| WO | 2014057282 | 4/2014 |

OTHER PUBLICATIONS

Search Report and Written Opinion—Corresponding PCT Application No. PCT/US2016/013299, dated Jun. 9, 2016, 13 pages.

(Continued)

*Primary Examiner* — Eric Hug
(74) *Attorney, Agent, or Firm* — Leber IP Law; Celia H. Leber

(57) ABSTRACT

Tire assemblies are disclosed. In one embodiment a tire insert assembly includes an elastomeric tire insert constructed to be received within a tire, the tire having sidewalls and a tread portion. An upper crown surface of the tire insert and a lower surface of the tire define an outer chamber and the tire insert defines an inner chamber. The tire insert may be configured to support a substantial portion of the sidewall of the tire when the inner chamber is inflated.

19 Claims, 18 Drawing Sheets

(56) References Cited

U.S. PATENT DOCUMENTS

| | | | |
|---|---|---|---|
| 2,898,969 A * | 8/1959 | Pfeiffer | B60C 5/22 |
| | | | 152/341.1 |
| 2,964,084 A | 12/1960 | Tubbs | |
| 3,025,902 A * | 3/1962 | Sanderson | B60C 17/01 |
| | | | 152/340.1 |
| 3,034,557 A * | 5/1962 | Beckadolph | B60C 5/22 |
| | | | 152/340.1 |
| 3,480,064 A | 11/1969 | Huber | |
| 3,901,750 A | 8/1975 | Bezbetchenko et al. | |
| 3,993,114 A * | 11/1976 | Hinderks | B60C 5/02 |
| | | | 152/310 |
| 4,153,095 A | 5/1979 | Sarkissian | |
| 4,216,809 A | 8/1980 | Pixley | |
| 4,263,953 A * | 4/1981 | Miceli | B60C 17/01 |
| | | | 152/158 |
| 4,995,438 A | 2/1991 | Weber | |
| 5,031,679 A | 7/1991 | Shoner | |
| 5,273,093 A | 12/1993 | Newton | |
| 7,669,627 B2 | 3/2010 | Douglas | |
| 2003/0178116 A1 | 9/2003 | Yamaguchi et al. | |
| 2004/0177908 A1* | 9/2004 | Hsieh | B60C 5/22 |
| | | | 152/339.1 |
| 2015/0013870 A1 | 1/2015 | Kyle | |
| 2016/0089934 A1 | 3/2016 | Krefting | |

OTHER PUBLICATIONS

Tubliss Gen 2.0, 5X Tougher, "Traction is the Key to Performance", www.nutechonlinestore.com; http://nutech.com/tubliss/#sthash.RaS0T68P.dpbs, downloaded Jul. 28, 2015.

* cited by examiner

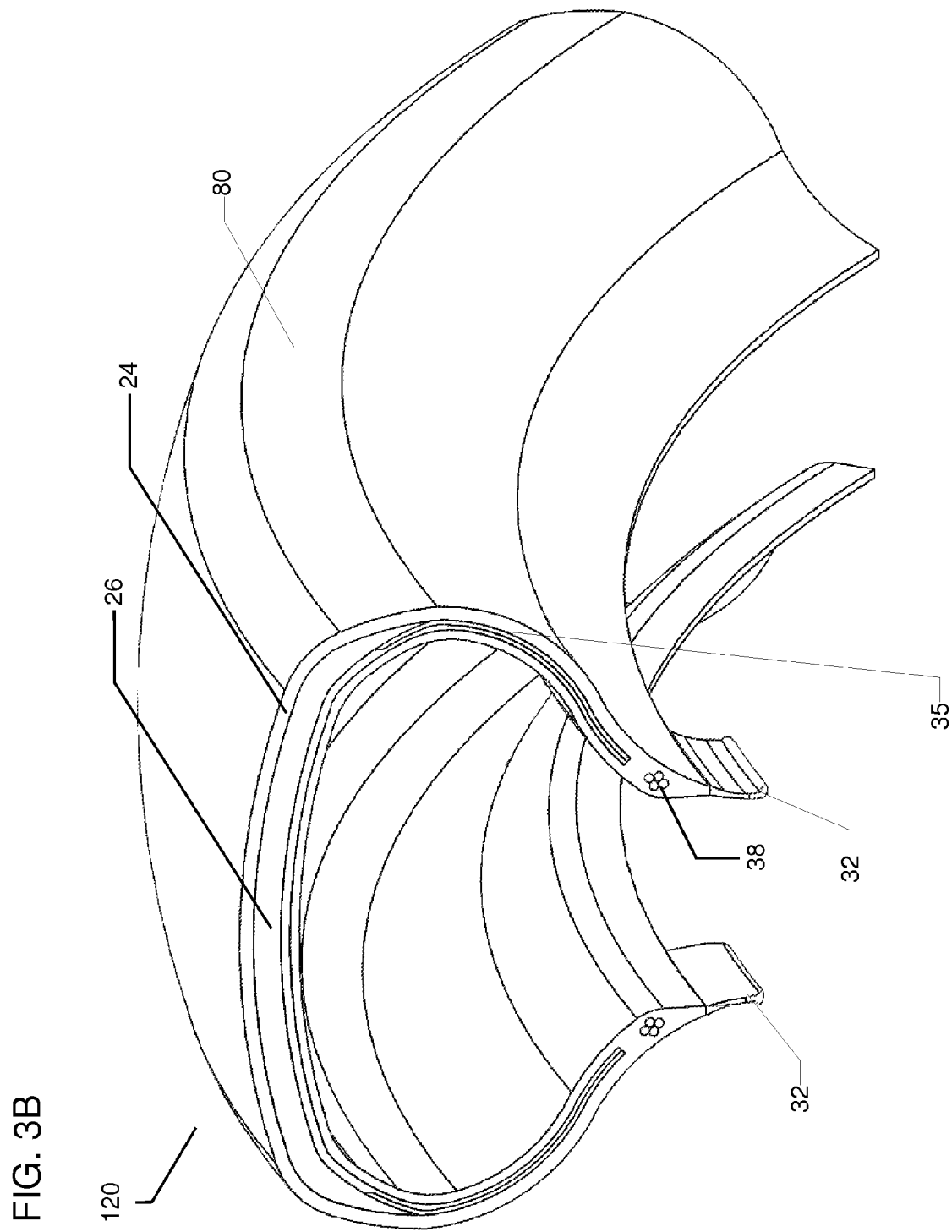

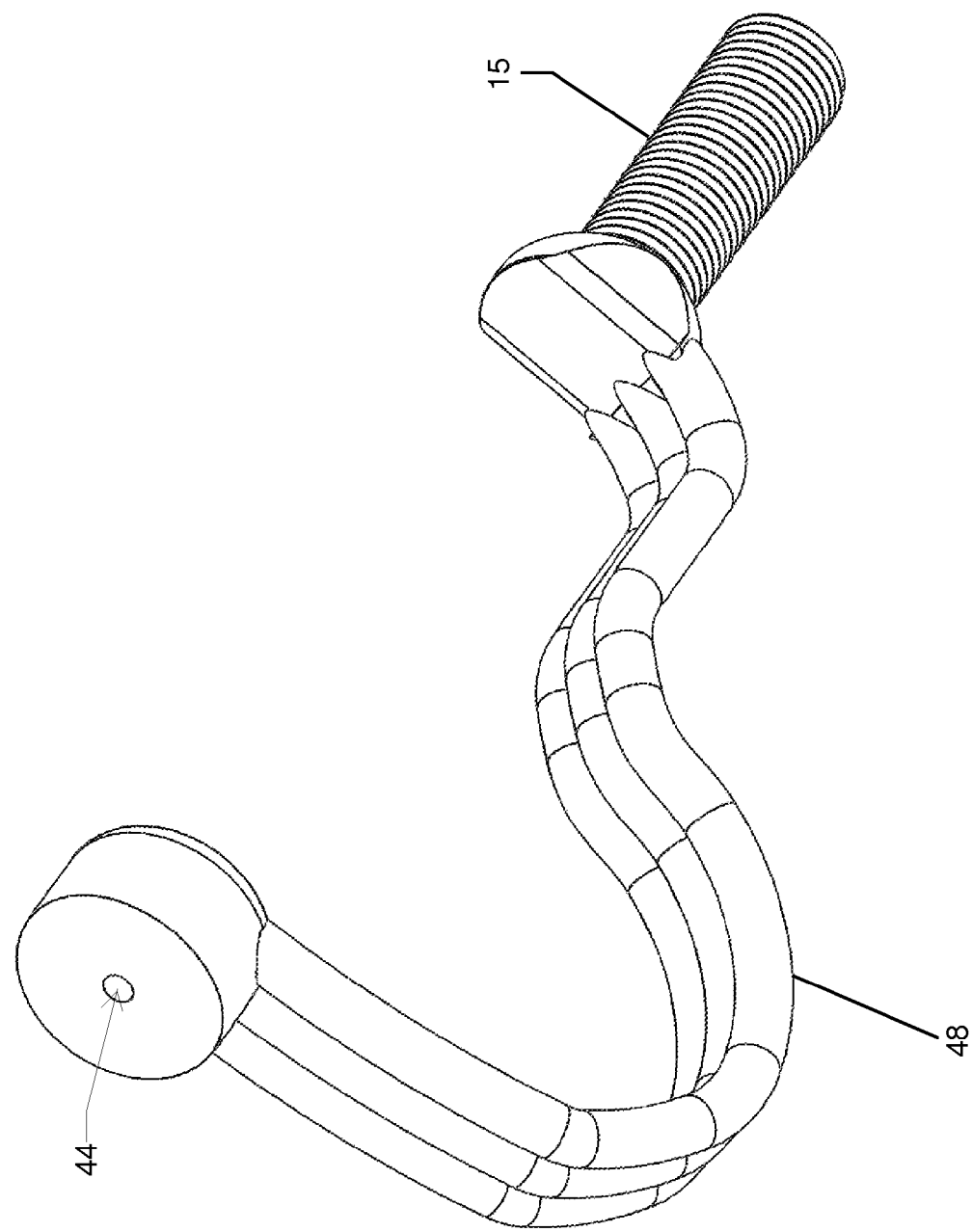

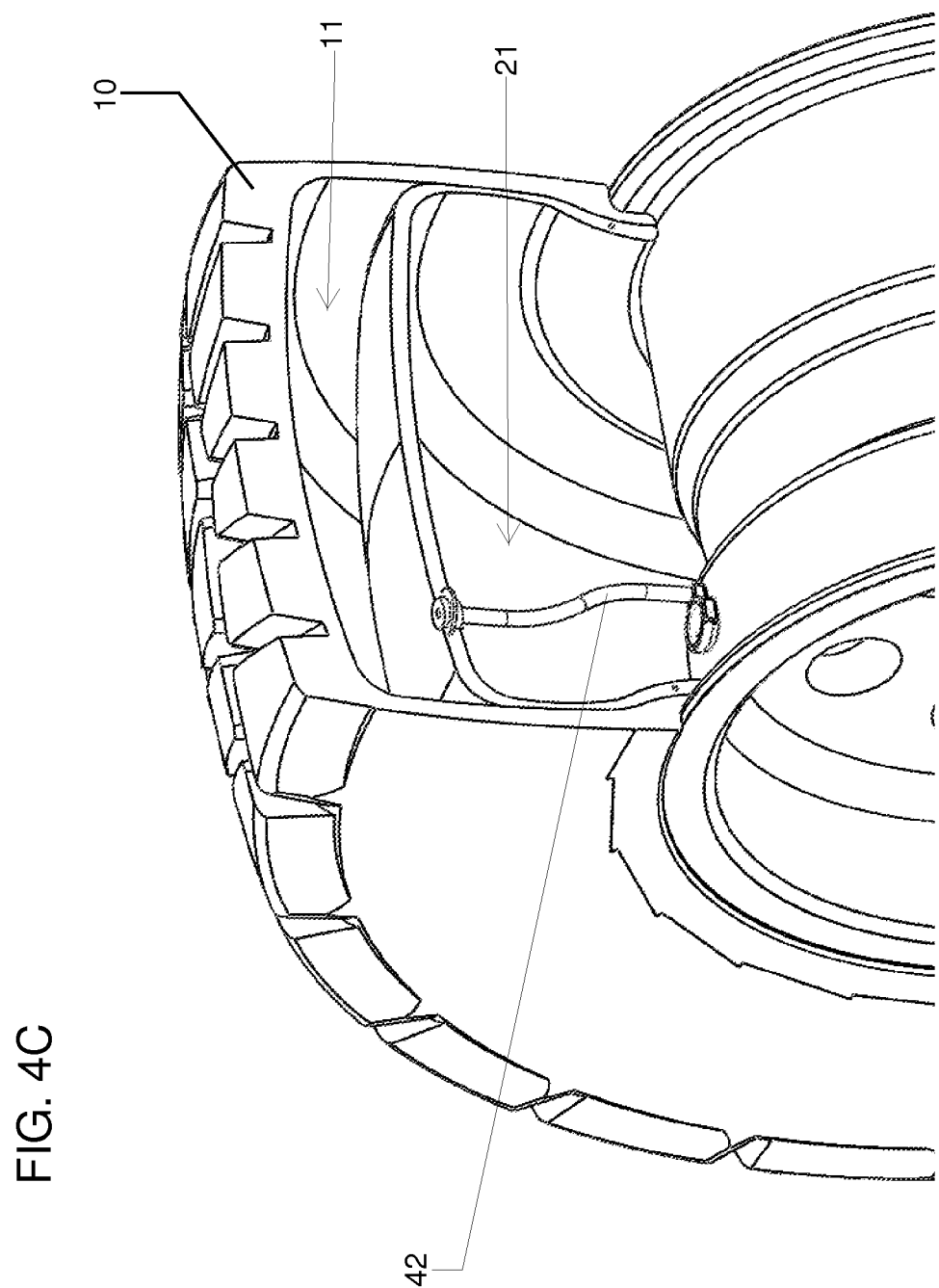

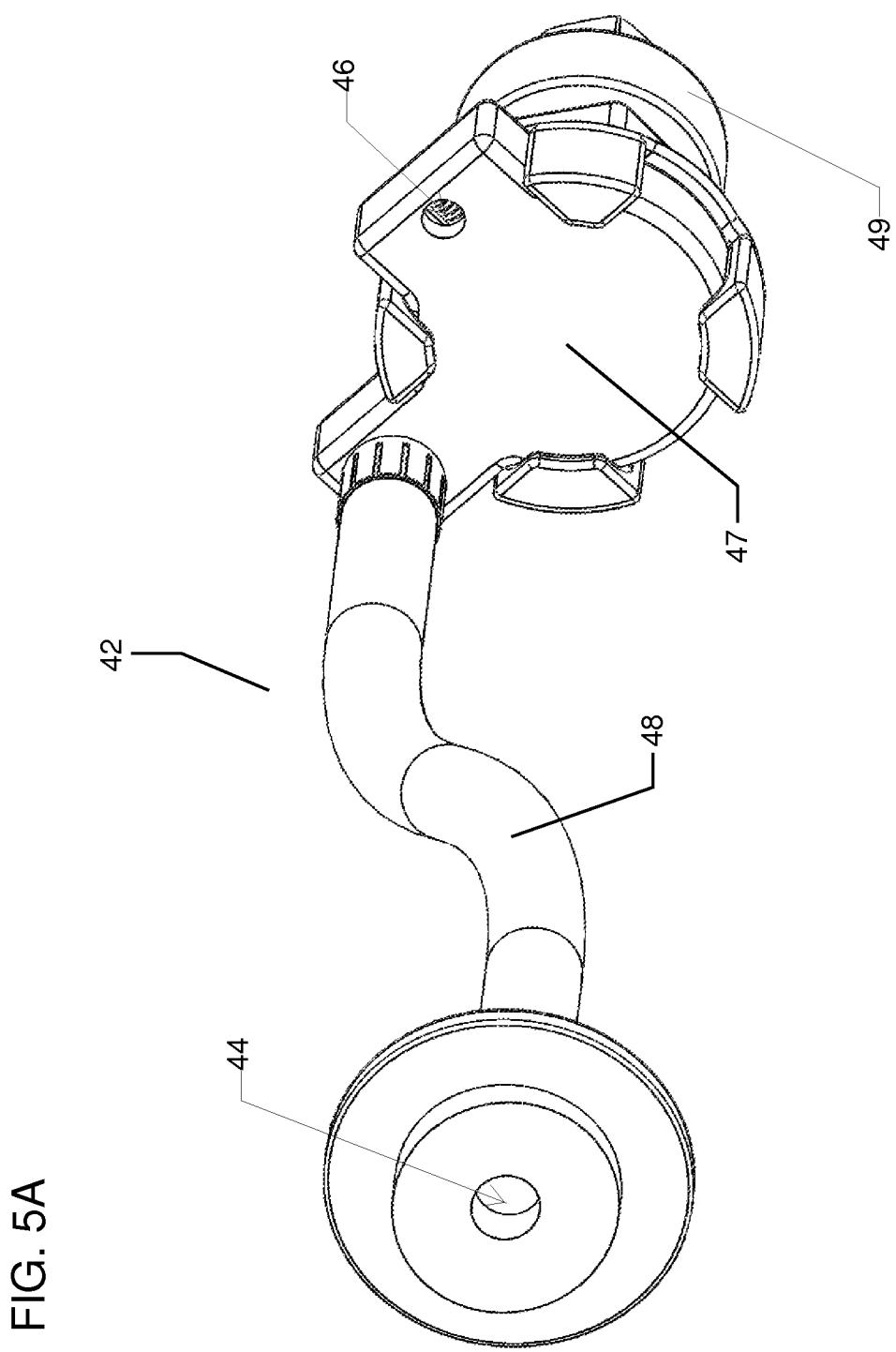

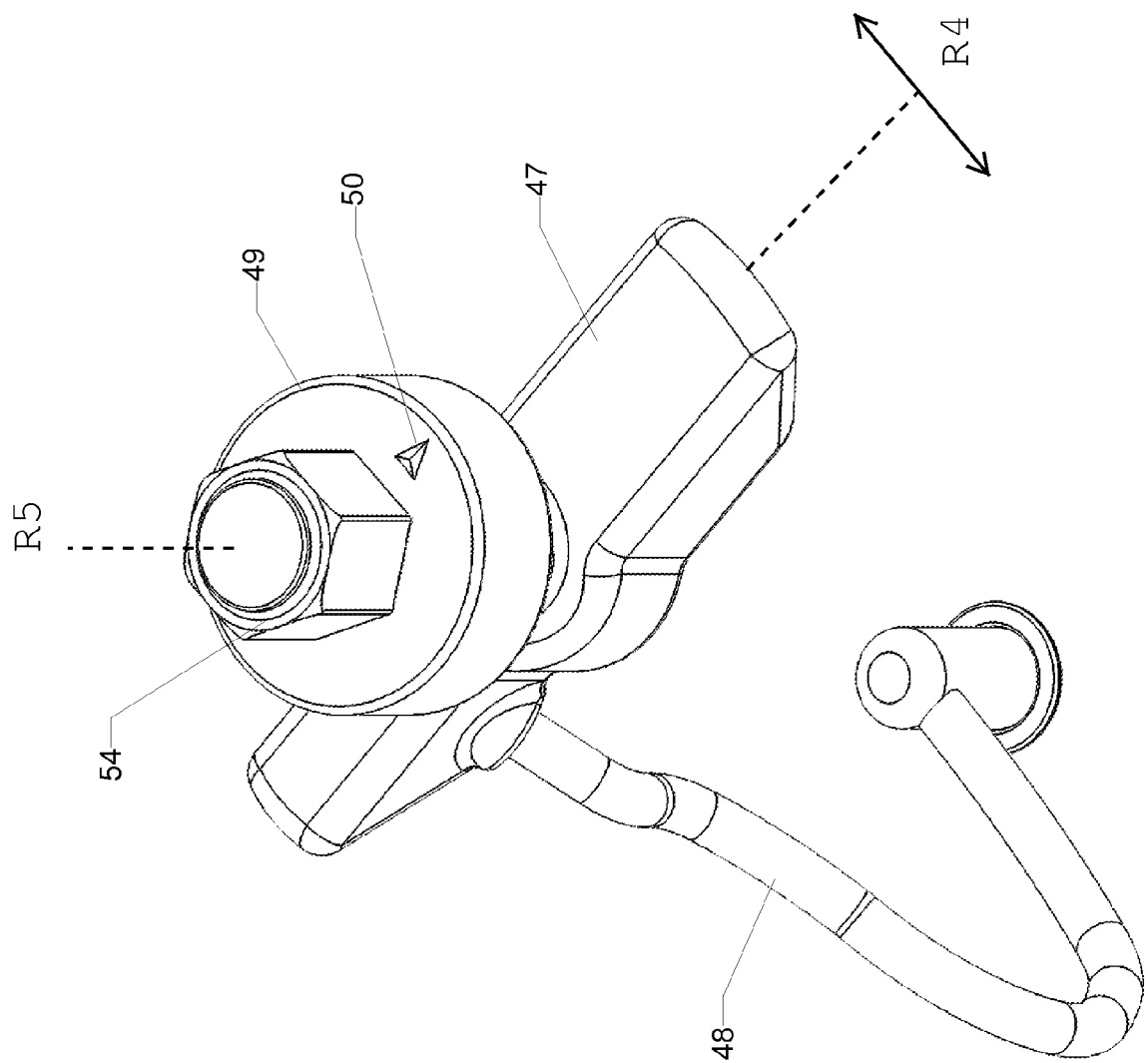

2-CHAMBER TIRE PRESSURE TUNING SYSTEM

BACKGROUND

Transportation in the modern era relies upon tires. Tires allow for rapid travel over varied terrain and conditions by maintaining a cushion of air that a vehicle rides upon.

Typical tire construction involves the use of a tubeless system, as seen in modern cars and in some cases on bicycles, or a tubed-tire system, common in bicycles. The components of a tubeless tire system include air that is captured in a chamber created by the rim of the wheel, the inner surface of the tire and a valve that is attached to the rim. The components of a tubed-tire system capture air in a flexible, elastomeric tube that lines the chamber defined by the rim and inner surface of the tire. In this system the valve is incorporated into the tube. These systems and their components are well known in the art.

Varying the relative air pressure of the tire, e.g. increasing or decreasing the air pressure, provides support for the combined vehicle, operator and passenger weight, and affects ride quality, handling characteristics, rolling resistance and the size of the tire contact patch. Tire composition and material compound also affect the tire's inherent characteristics.

Both tire systems are vulnerable to air chamber failures resulting in collapse of the tire. These types of failures are commonly caused by punctures, e.g. by a sharp object, or pinch flats where the elastic, inner tube is pinched between the sidewall or tread portion of the tire and the rim as the result of a severe impact with the ground or an object. Tubeless systems are not subject to pinch flats, but the sidewall of the tire can be damaged from collapse, or the subsequent failure may force the bead of the tire off the rim.

SUMMARY

Generally, this invention relates to tires and tire technology. Tire insert assemblies are disclosed herein that provide two chambers within a tire. In some implementations, this two-chamber configuration allows the tire's performance to be readily fine tuned by the user. The tire insert assemblies may also prevent punctures and pinch flats, support the tire if a puncture does occur, and eliminates the need for a rim lock or bead lock in some applications.

In one aspect, the invention features a tire insert assembly comprising an elastomeric tire insert constructed to be received within a tire, the outer tire having sidewalls and a tread portion. An upper crown surface of the tire insert and an inner surface of the tire define an outer chamber, and the tire insert defines an inner chamber. The tire insert is configured to support a substantial portion of the sidewall of the tire when the inner chamber is inflated. By "substantial portion," we mean a distance above the rim that is sufficient to prevent detrimental deformation of the tire sidewall during use when there is less than 10 psi pressure in the outer chamber. Detrimental deformation is defined as sidewall collapse resulting in a pinch flat or unseating of the tire bead from the rim.

Some implementations include one or more of the following features.

The tire insert may make contact with and support the sidewalls of the tire a distance that is at least 70% of the tire sidewall height, measured from the rim to the start of the tread portion of the tire. The tire insert may extend up to the tread portion of the tire. The tire insert assembly further comprises a tube disposed within the tire insert, and the tube defines the inner chamber. The tire insert may include a generally flat crown portion and sidewall portions extending from either edge of the generally flat crown portion. The tire insert may include non-elastomeric, puncture-resistant elements. The puncture resistant elements may be disposed within the upper crown portion. At least some of the puncture resistant elements may extend down the sidewall portions. The layup of the non-elastomeric puncture resistant elements within a vulcanized enclosure will define the cross-sectional shape of the flat crown portion of the insert.

The tire insert assembly may further comprise belts that extend around the outer surface of the tire insert and center the tire insert within the tire cavity by restraint of the insert against the rim.

The tire insert assembly may further comprise tabs that interact with a rim on which the tire insert assembly is mounted and/or a bead of the outer tire to center the tire insert within the tire cavity.

In another aspect, the invention features a tire insert assembly comprising an elastomeric tire insert constructed to be received within a tire, the tire having sidewalls and a tread portion, an upper crown surface of the tire insert and an inner surface of the tire defining an outer chamber and the tire insert defining an inner chamber, and a manifold assembly configured to allow selective inflation of the inner chamber and outer chamber.

Some implementations include one or more of the following features.

The selection of the chamber to be inflated may be accomplished by rotation of a selector knob. The manifold assembly may comprise a manifold having an inlet port in fluid communication with each chamber, and a valve disposed in each port. The valves may comprise poppet valves.

In another aspect, the invention features a tire insert assembly comprising an elastomeric tire insert constructed to be received within a tire, and an inner tube disposed within the tire insert, and the tire insert has side walls that are configured to protect the inner tube and a generally flat crown portion configured to support the outer tire when the inner chamber is inflated and the pressure in the outer chamber is from 0 to 5 PSI. As in the previous aspect, the tire has sidewalls and a tread portion, an upper crown surface of the tire insert and an inner surface of the tire defines an outer chamber, and the tire insert defines an inner chamber.

Some implementations include one or more of the following features.

The tire insert may include a generally flat crown portion and sidewall portions that extend from either edge of the generally flat portion. The tire insert may include non-elastomeric puncture resistant elements. The puncture resistant elements may be disposed within the upper portion. At least some of the puncture resistant elements may extend down the sidewall portions. The layup of the puncture resistant elements within the elastomeric tire insert may define the cross-sectioned shape of the crown portion.

The tire insert assembly may further comprise belts that extend around the outer surface of the tire insert and center the tire insert within the tire cavity. Tabs may interact with the rim and/or a bead of the tire to center the tire insert within the wheel and tire assembly cavity.

In another aspect, the invention features a tire insert assembly configured so that the pressure in the inner chamber can be adjusted relative to the pressure in the outer chamber, and the pressure in the inner chamber does not need to be a predetermined rated pressure. As in the previous aspect, the assembly includes an elastomeric tire insert constructed to be received within a tire, the outer tire having sidewalls and a tread portion, an upper crown surface of the tire insert and a lower surface of the outer tire define an outer chamber, and the tire insert defines an inner chamber. An inner tube may be disposed within the tire insert, and the tire insert may have side walls that are configured to protect the inner tube.

While in use, the inner chamber may be inflated to a pressure of less than 90 PSI. For example, the inner chamber may be inflated to a pressure of from about 10 to 90 PSI.

In another aspect, the invention features a tire insert assembly comprising (a) an elastomeric tire insert constructed to be received within an outer tire, the outer tire having sidewalls and a tread portion, an upper crown surface of the tire insert and a lower surface of the outer tire defining an outer chamber and the tire insert defining an inner chamber; and (b) a first foam member having a first density, disposed in the outer chamber.

A second foam member may be provided, having a different density than the first foam member, the first foam member being replaceable by the second foam member to provide different handling characteristics to the outer tire.

The tire insert assembly may further comprise additional foam inserts having different densities to simulate different air pressures in the outer chamber. The foam may be constructed of polyurethane foam or some other open or closed cell, elastomeric substance, such as polyethylene or similar.

DESCRIPTION OF THE DRAWINGS

FIG. 3B is a perspective view of the tire insert according to one embodiment removed from the device.

FIG. 4B is a perspective view of a component of the device shown in FIG. 4A.

FIG. 4C is a perspective view of a device according to an alternate embodiment that includes a manifold to inflate an inner and outer tubeless chamber.

FIG. 5A is a perspective view of the manifold shown in FIG. 4C according to another embodiment.

FIG. 7D is a bottom, perspective view of the manifold shown in FIG. 7A.

DETAILED DESCRIPTION

The present disclosure relates generally to tires, and to tire insert assemblies designed to reside inside a chamber defined by an inner surface of a tire and a wheel rim.

Single chamber tire systems typically require a higher relative pressure to ensure secure tire bead retention on the wheel rim thereby ensuring predictable and reliable tire performance. Tire bead retention systems, commonly referred to as rim locks, are well known in the art and allow substantially lower tire pressures to be used in single chamber tire systems. The present invention creates a dual chamber tire environment wherein an inner chamber is defined by a tire insert assembly that is encased by the tire and the rim. This configuration advantageously eliminates the need for using a rim lock system when running low tire pressures. Furthermore, the present invention provides good performance when running very low to zero air pressure in the outer chamber. The configuration of the two chambers also allows a user to "tune" the performance of the tire by adjusting pressure in both chambers as will be discussed in detail below.

Referring to FIGS. 1-3A, the tire insert assembly is configured to reside inside a tire 10 that is mounted on rim 12. Only a short section of the tire 10 has been shown to highlight the tire insert assembly. Furthermore, rim 12 is shown without spokes for clarity. The tire can be, for example, any commercially available or original equipment manufacturer tire.

Figure 1:
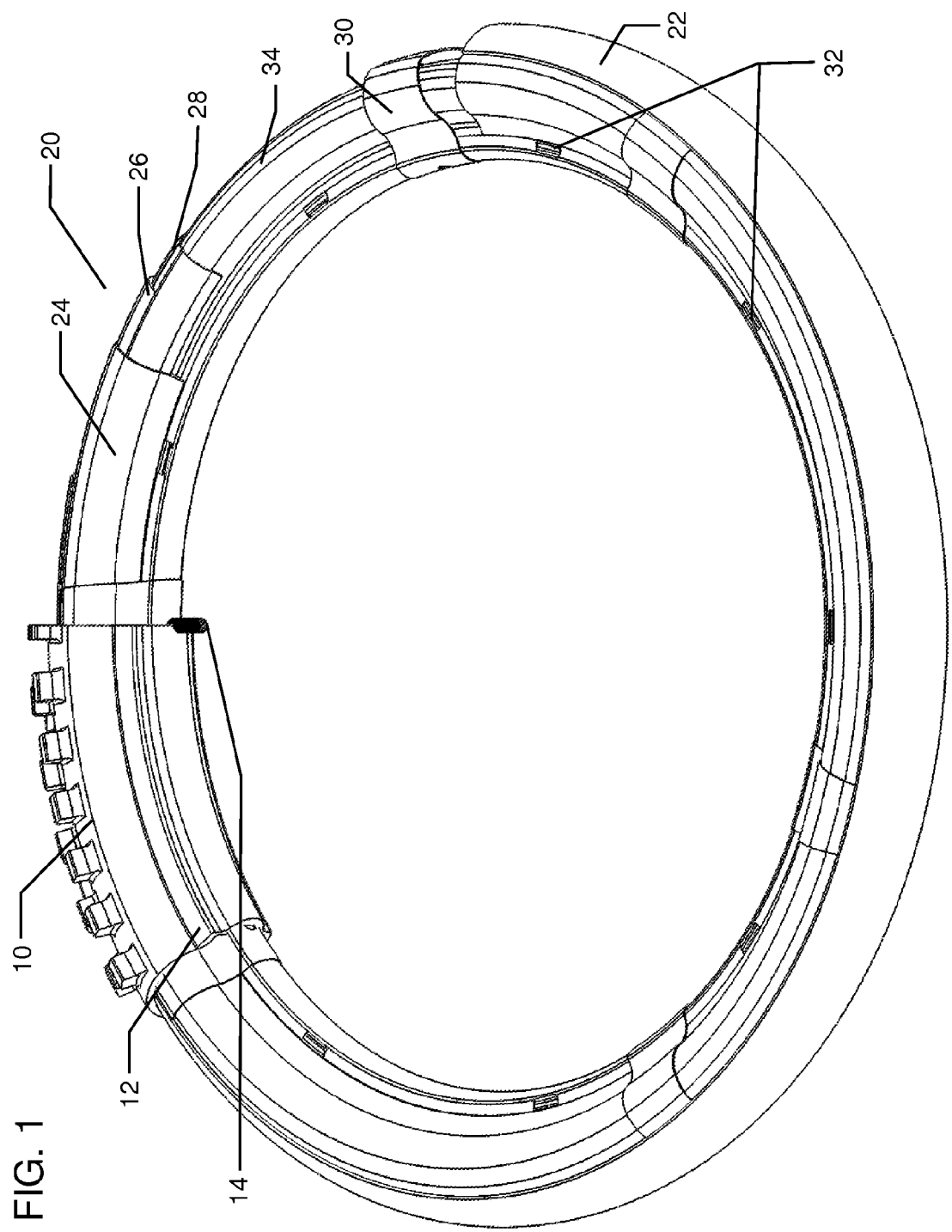
FIG. 1 is a perspective view of a device according to one embodiment with the layers of the device exposed.
Figure 2:
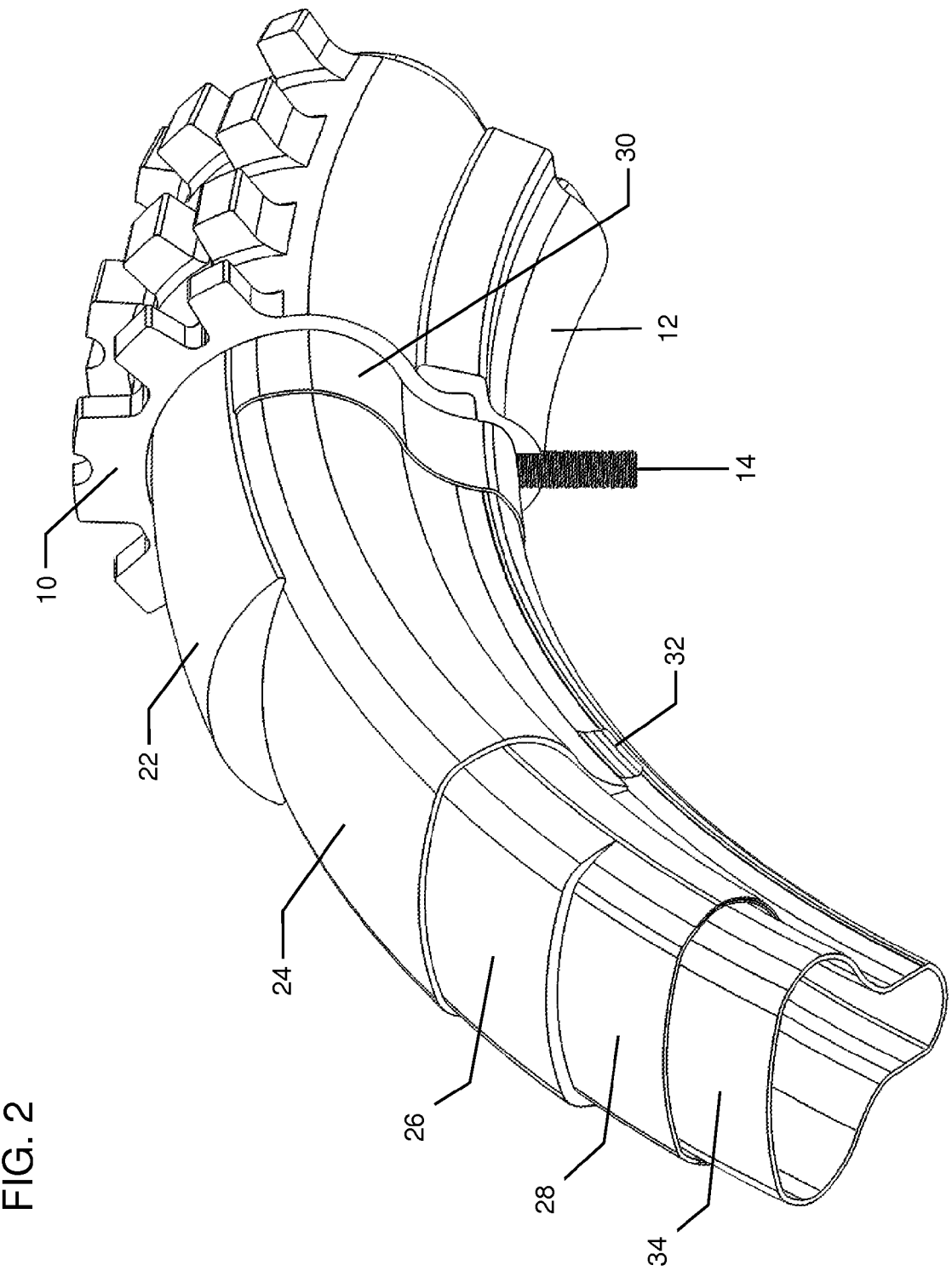
FIG. 2 is a perspective view of a portion of the device shown in FIG. 1 with the successive layers partially exposed.
Figure 3A:
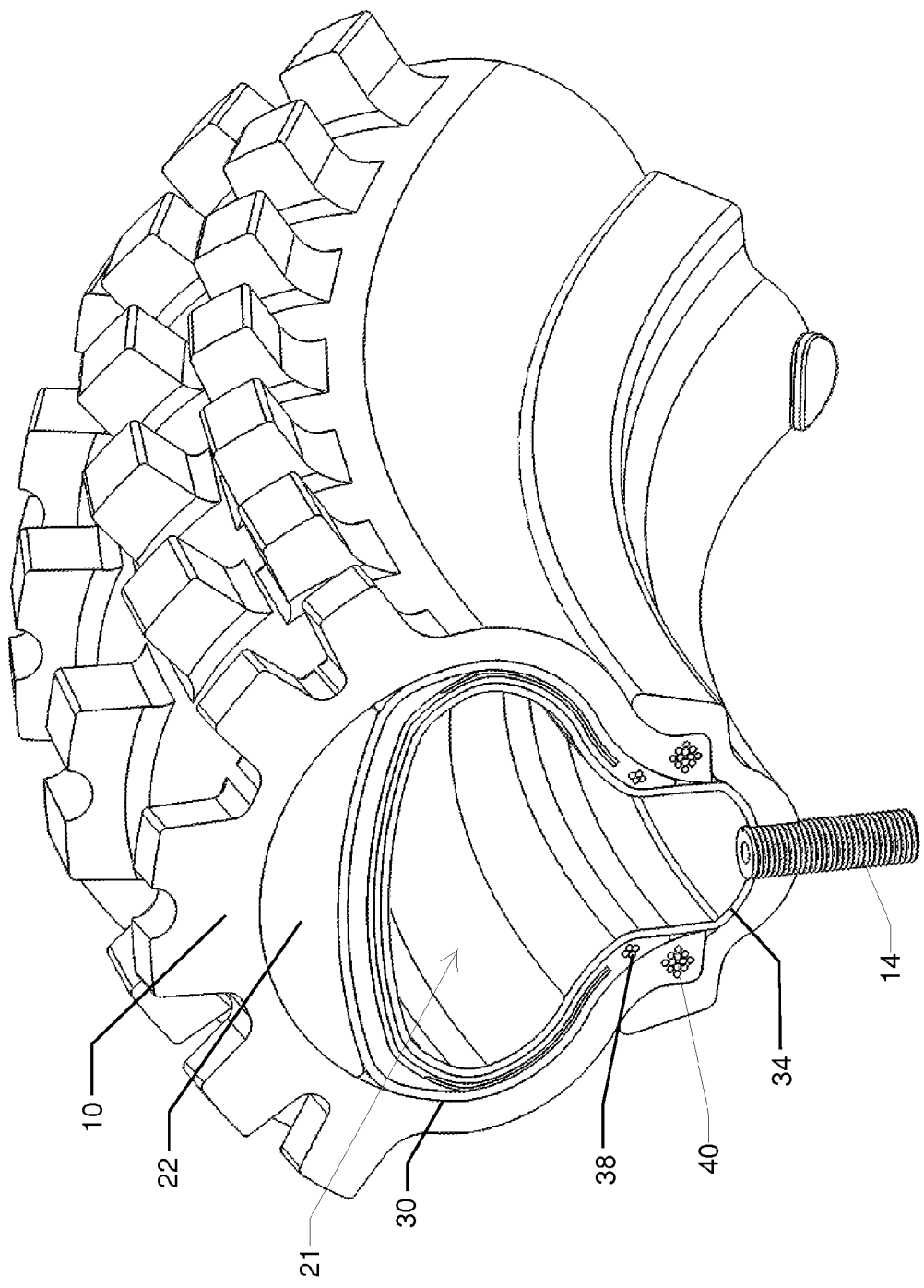
FIG. 3A is a perspective, cross-sectional view of the device.

Referring to FIGS. 1-3A, the tire insert assembly includes a tube 34 having an inflation valve 14 that protrudes through the rim, as seen in FIG. 3A, and extends from the rim towards the center of the wheel. The tire insert assembly also includes multiple layers that are laminated together to form a single element referred to below as the tire insert. The tube 34 is centered within the tire insert and the tire insert assembly is centered within the tire cavity, i.e., the cavity defined by the wheel rim and the tire, by a plurality of non-elastomeric belts 30 and/or tabs 32. The tube is sized appropriately to fill the inner chamber created by the insert and the rim, and is restrained by the sidewalls of the tire.

Referring to FIG. 3B, a tire insert 120 includes an outer vulcanized layer 24, a first puncture resistant layer 26, a sidewall protection layer 35, and an insert bead lock 38. Insert bead lock 38 is a plurality of non-elastomeric strands, e.g. Kevlar® strands, which define a bead.

Figure 4A:
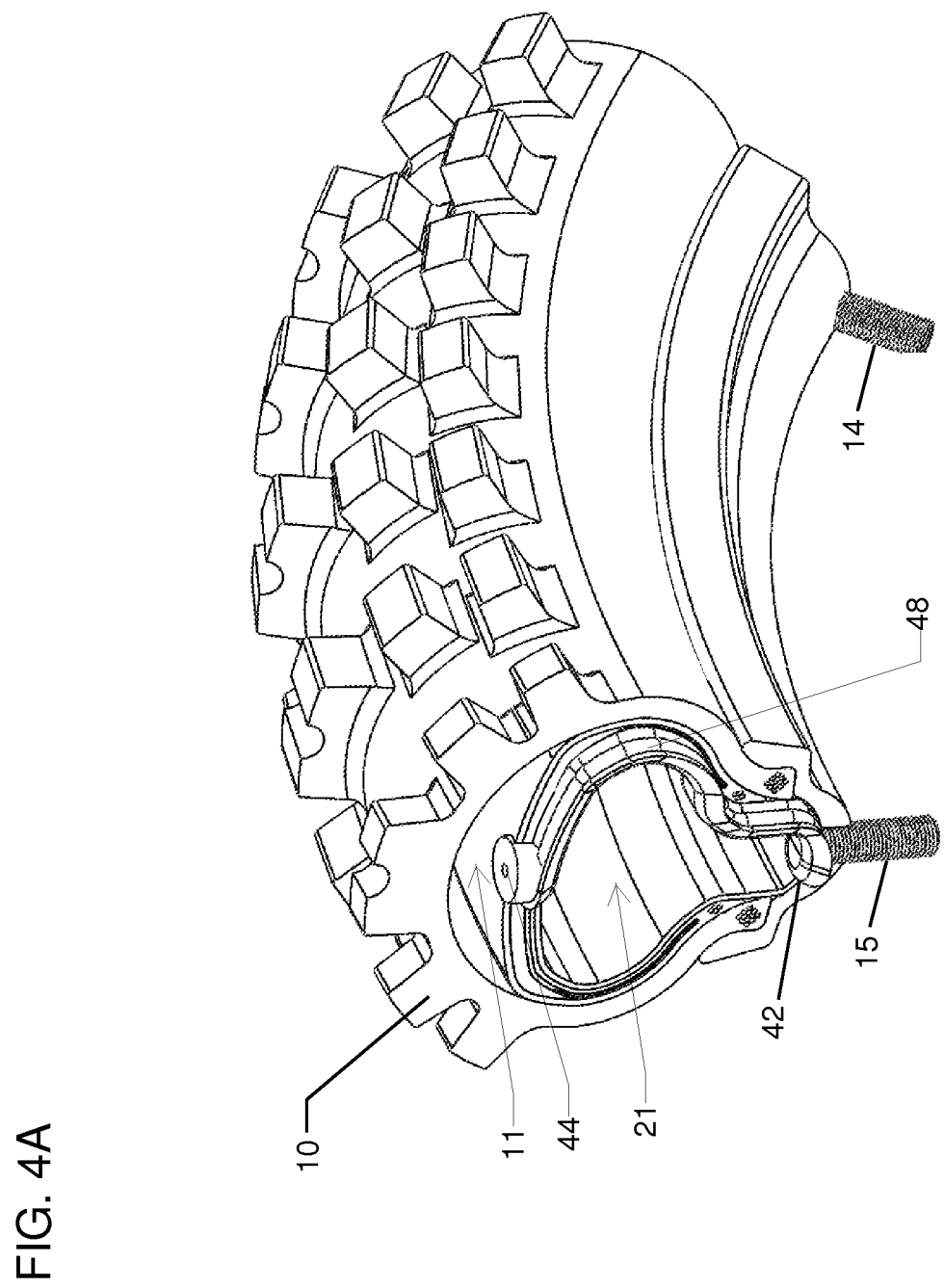
FIG. 4A is a perspective, cross-sectional view of a device according to an alternate embodiment.

The placement of the tire insert assembly 20 inside a tire mounted to a rim creates two distinct and independent chambers; an outer chamber 11 and an inner chamber 21. In some embodiments (e.g., as shown in FIGS. 4A and 4C and discussed below) both chambers may be filled with air or another compressible gas. In the embodiment shown in FIGS. 1-3A, the inner chamber is filled with a compressible gas, e.g. air, nitrogen or similar, by inflating tube 34, while the outer chamber contains a molded foam element 22.

Referring to FIG. 3A, the foam element 22 takes up substantially the entire volume of the outer chamber when the tube is inflated. The foam element may be, for example, a polyethylene closed-cell foam with a density of 1.71 pounds per cubic foot, and a cell count of 20. In this embodiment, the foam is configured to represent a specific tire pressure. Multiple foam inserts having different densities would be made available to the user so that the relative tire pressure could be tuned to address specific vehicle handling and terrain conditions similar to how air is either added to or removed from a single-chamber, air-filled tire to accommodate various riding or driving and surface conditions. For example, travel over sand typically necessitates utilizing a lower tire pressure for optimized traction and handling. When a different terrain is encountered and/or traction is needed, the user would simply dismount one bead of the tire, remove the foam element and replace it with another of a different density.

The use of foam in the outer chamber also provides a highly puncture resistant and durable tire using the foam insert. Travel no longer relies on maintaining a secure chamber of air as is typical in single chamber tire systems.

Referring to FIGS. 1, 2, 3B, and 6, a plurality of insert centering tabs 32 and/or the belts 30 are spaced evenly around the circumference of the tire insert. These features center the tire insert assembly in the tire cavity and ensure rotational balance of the tire-wheel assembly. In some embodiments, the tabs may be excluded, for example in lightweight applications, such as mountain bike tires. The tabs 32 are advantageously configured inboard of the tire bead 40 where no rim shoulder is present to center the insert in the tire chamber, as seen in FIG. 2. The insert bead 38 diameter is advantageously configured at a greater inner diameter than the tire bead 40 inner diameter. The tabs 32 are configured to have an inner edge that matches the inner diameter of the tire, and employ a feature to catch the inboard inner edge of the tire bead during inflation. The bead of the tire insert having a larger diameter than the tire bead creates a uniform and smooth tube inflation chamber and decreases insert system weight because less material is needed. In addition, the tube is protected from damage due to contact with tire irons when dismounting and/or mounting a tire. Bicycle and motorcycle wheels have relatively narrow rims as compared to the rims used on larger machines, such as cars, trucks, or large scale wheeled machinery, and therefore in these applications the tab will index off the tire bead edge to ensure proper tire balance and alignment.

Figure 6:
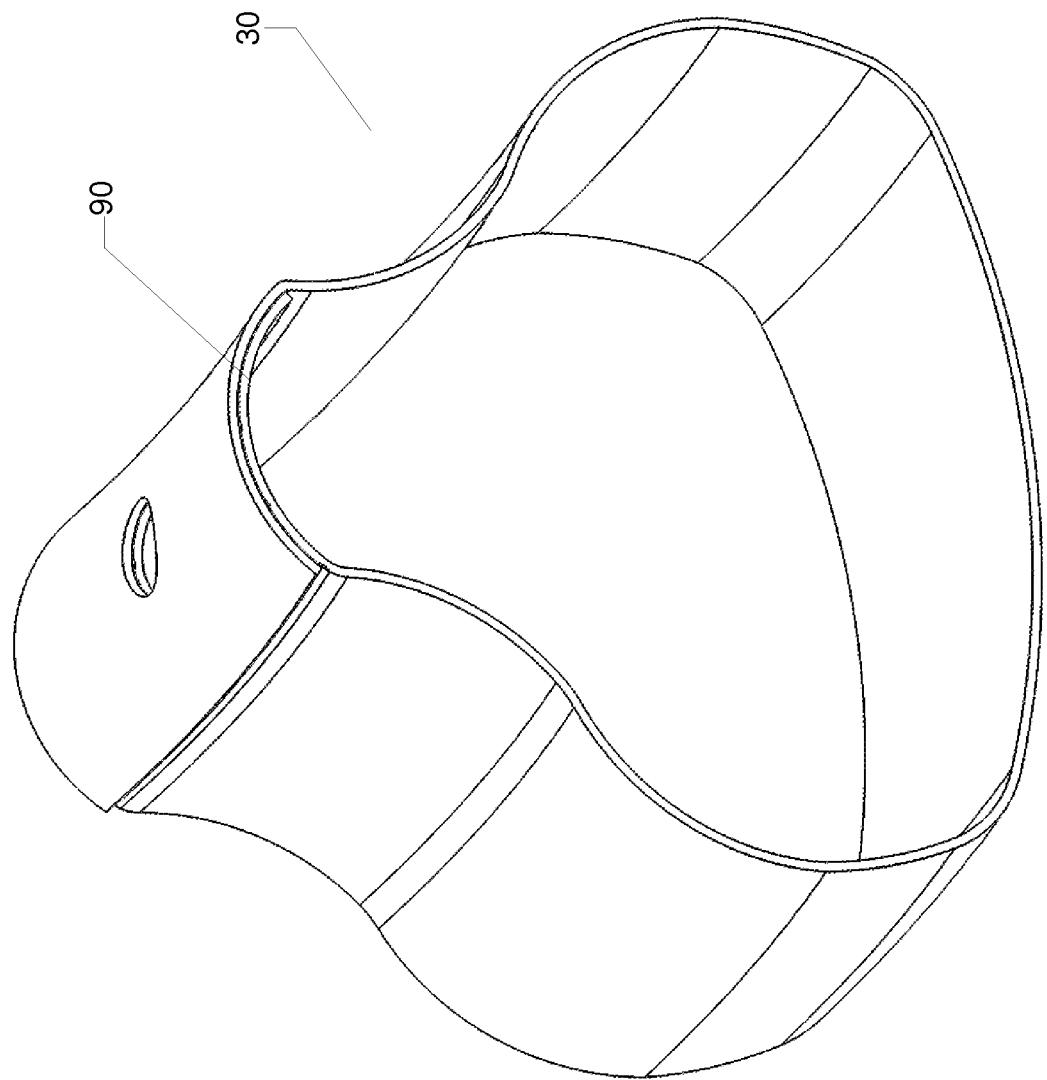
FIG. 6 is a perspective view of one component of the tire insert centering belt device.

Referring to FIG. 6, belts 30 are non-elastomeric and configured with a fixed circumference sized appropriately for the tire insert assembly application. The pre-formed shape of the belt aids in centering the tire insert assembly ensuring rotational balance of the tire. The shape of the belt is determined to correspond to the geometry of the rim with which the tire insert assembly will be used. Centering is accomplished when the tube inflates in the rim, which occurs before the tire bead seats on the rim. Some embodiments of the belts feature a way to change the size of the belt that allows accommodation of various tire volume configurations, such as an overlapping section 90 as seen in FIG. 6. Belts 30 may utilize, for example, a hook and loop style fastener, such as Velcro™ brand hook and loop type fastener, or other similar types of fasteners that would allow the belts to be easily adjusted, removed or added as needed.

Referring to FIG. 3A, when the tube 34 is inflated it expands outward toward the rim walls applying pressure to the bead of the tire 40. The tube sets the bead as in a conventional tire because the insert does not occur at the bead location. There is a slight overlap between the insert and tire bead, and the insert applies pressure to the sidewall above the bead, so it will apply some pressure to the bead as it is expanding and locating. This interaction secures the tire bead to the rim 12. This feature ensures the connection between the rim and the tire bead even when relatively low or no outer chamber pressures are used. This interaction also eliminates the need for a rim lock device that mechanically secures the bead of the tire to the rim. Rim locks are well known in the art and typically slow and complicate the process of replacing a damaged tire or tube on a rim, as well as adding rotational weight to the wheel. The tire insert assembly 20 allows rapid tire replacement or dismounting by simply deflating the tire insert inner chamber pressure, thereby releasing pressure on the rim bead enabling the tire to be levered over the rim and removed.

Furthermore, typical off-road tires as seen in FIGS. 3A, 4A, 4C and 7A are configured with oversized tire sidewall thicknesses and reinforcement to allow use of low pressures without sacrificing vehicle support, for example, while cornering or under load. The present invention adds sidewall thickness and eliminates the need to utilize heavy or oversized sidewall tires because the tire insert assembly is configured to extend a substantial way up the sidewall of the tire and typically to the transition point of the sidewall to the traction patch of the tire. When inflated, the tire insert assembly allows increased sidewall air pressure providing greater tire sidewall support and durability. This sidewall support also allows the outer chamber to be empty (no foam element) and at 0 psi pressure during use without the sidewalls buckling or the tire bead coming off the rim.

Referring to FIG. 2, the tire insert assembly is advantageously configured with multiple layers of puncture resistant material, such as Kevlar® impregnated layers or similar. Layer 28 extends down the sidewall portion of the insert as well as across the generally flat rolling surface portion. Layer 26 provides additional puncture resistance to the rolling surface and helps define its generally flat surface. These multiple layers are sealed together by vulcanization with a vulcanized elastomeric layer 24. Advantageously, this configuration mitigates or nearly eliminates the possibility of tire failure by sustaining a puncture or a pinch flat, where the sidewall of the tire or inner tube is pinched between the rim and upper portion of the tire when the sidewall collapses as a result of a large impact or due to running too low of tire pressure in a conventional, single-chamber system. The materials used will depend on the application. For example, expensive and light materials may be employed when application weight is the primary consideration, and braided steel or greater strength material may be employed when durability is the primary concern, e.g. when used in large military vehicles. When used in lighter applications, such as in mountain bike tires, the puncture resistant layers in the insert will be similar in thickness to the current tire puncture resistant layers in mountain bike tire construction, for example, 1-2 mm.

Figure 7A:
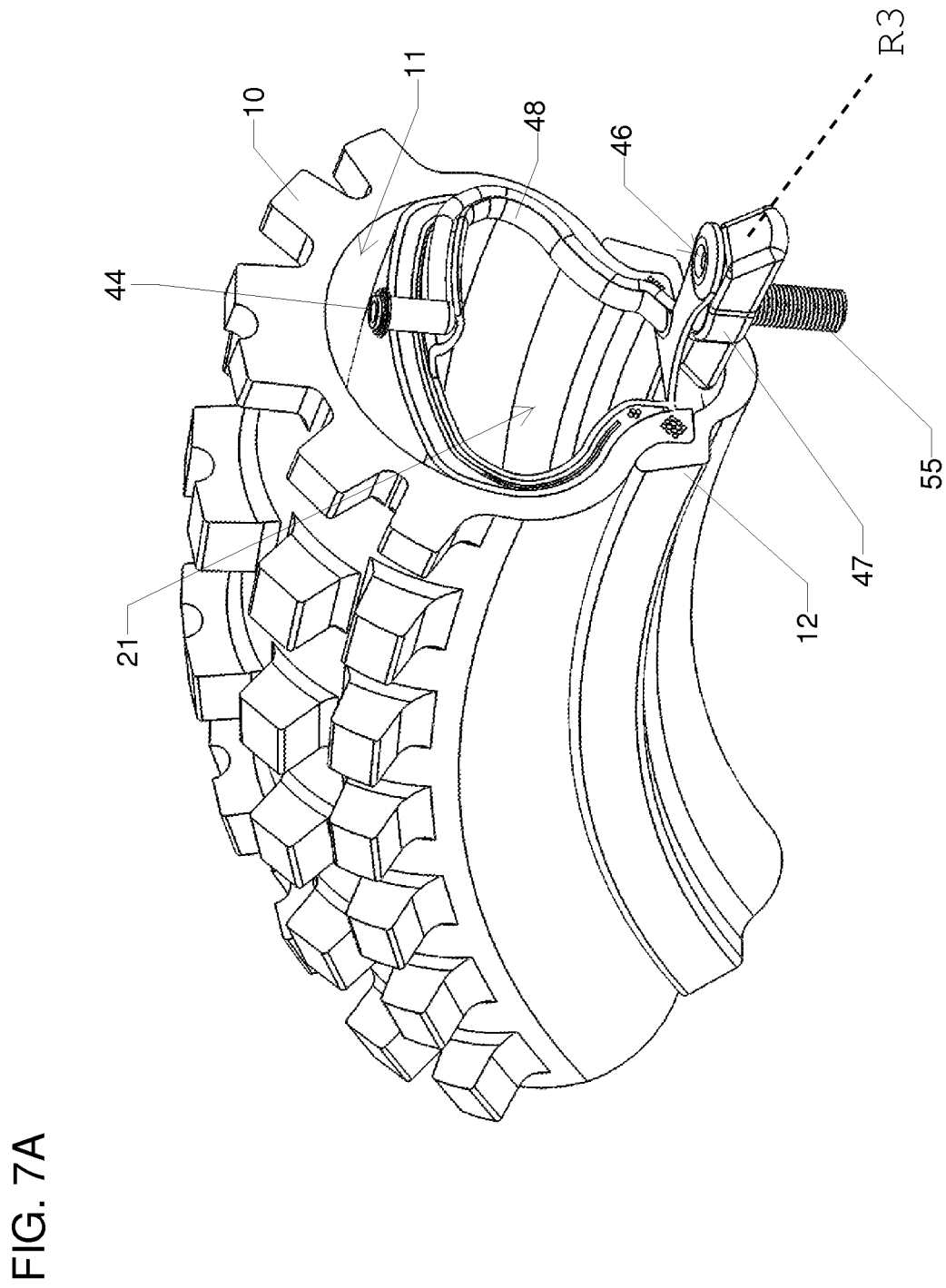
FIG. 7A is a perspective view of a tire assembly according to one embodiment shown with a portion of the rim and tire removed for clarity.
Figure 7B:
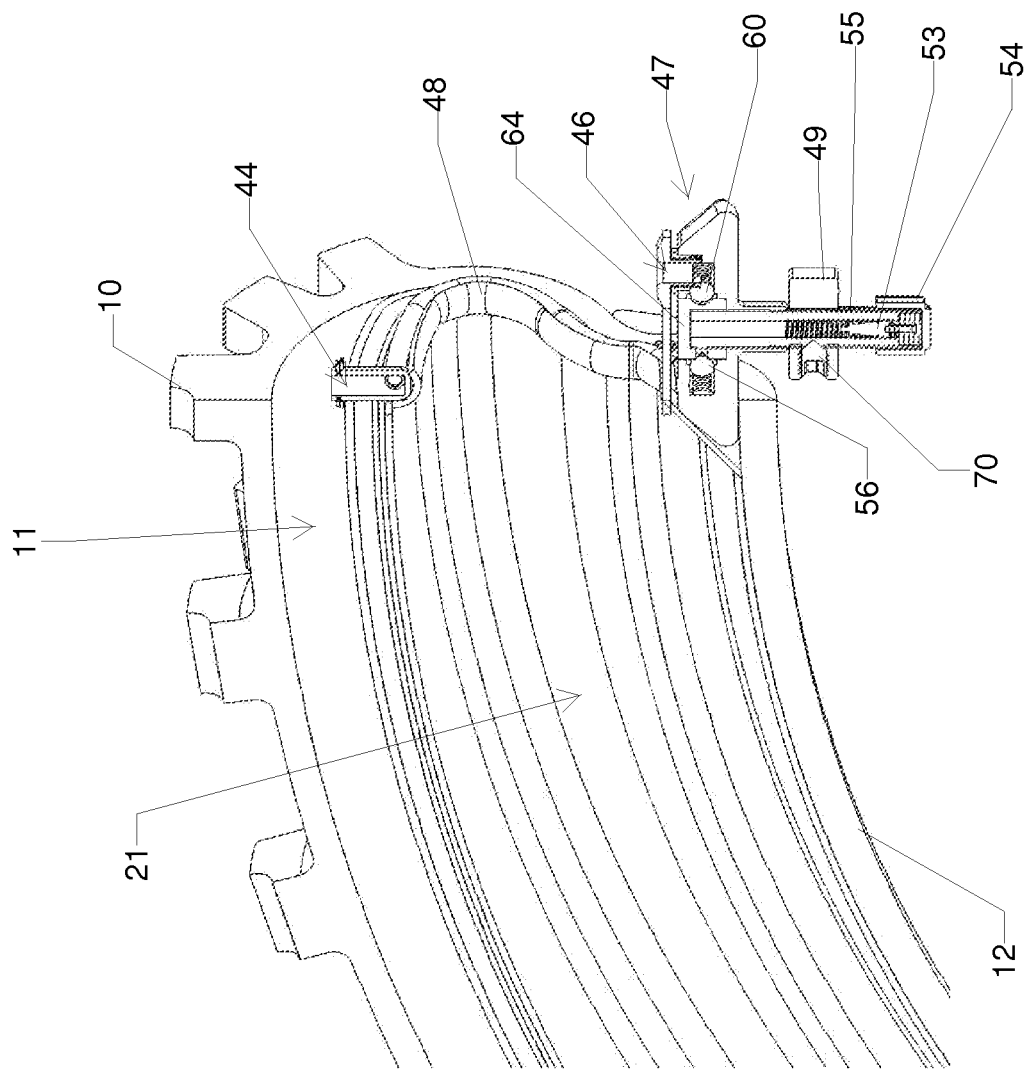
FIG. 7B is a cross-sectional view of the tire assembly shown in FIG. 7A taken at reference line R3 as seen in FIG. 7A.
Figure 7C:
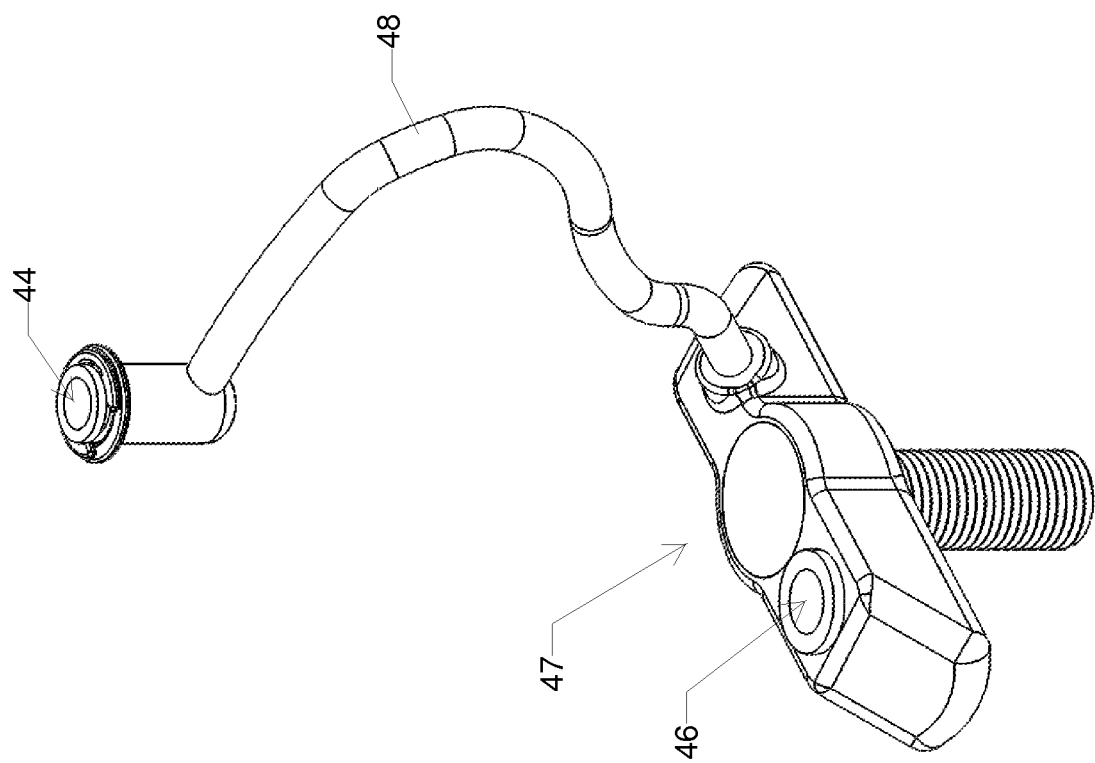
FIG. 7C is a perspective view of the manifold shown in FIG. 7A.
Figure 7E:
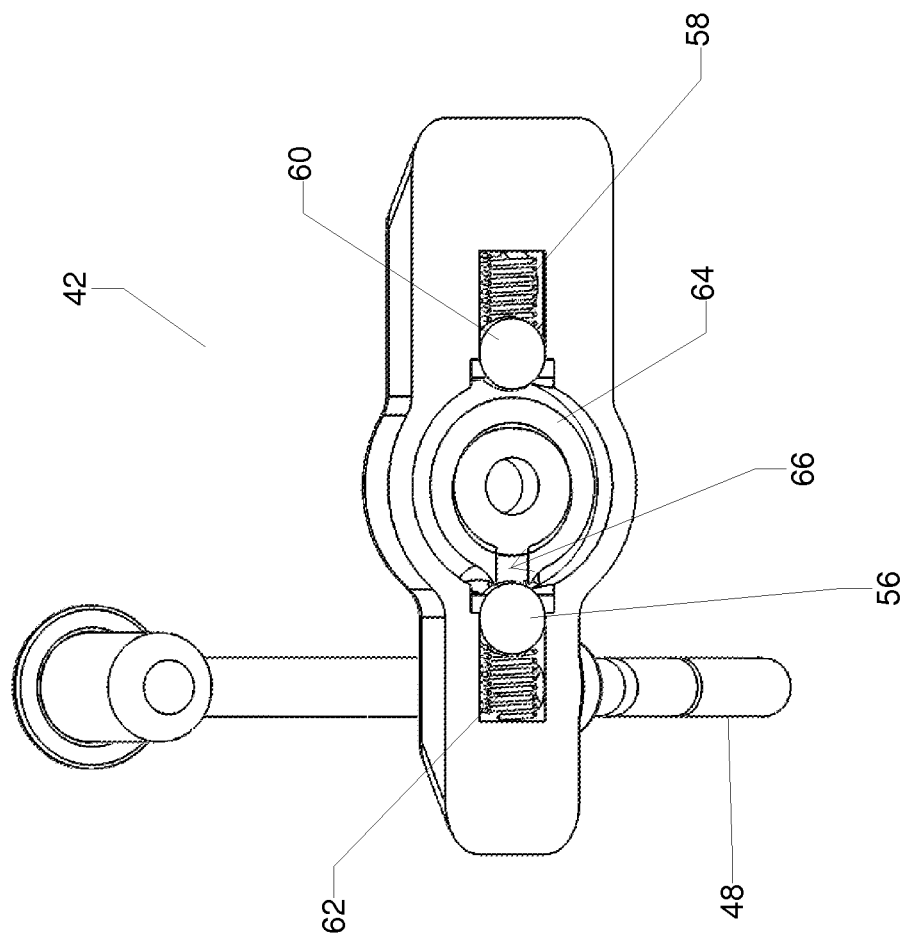
FIG. 7E is a cross-sectional view of the manifold taken at reference line R4 as seen in FIG. 7D.

Referring to FIGS. 4A and 4C, the outer chamber 11 may be filled with air or a similar compressible gas instead of foam. In this embodiment, either a dual valve inflation system is employed (as shown in FIG. 4A) where one valve 14 communicates with the inner chamber and a second valve 15 communicates with the outer chamber, or a single, dual-chamber valve would be used, as seen in FIGS. 4C, 7A and 7B. In either case, the user can easily and independently control the pneumatic pressure in both the inner chamber 21 and outer chamber 11, enabling precise pressure control and therefore tire performance and traction to accommodate a wide variety of driving or riding conditions. The tire insert provides sufficient protection to the tube to allow the tube (and thus the inner chamber) to be used at relatively low inflation pressures. For example, the inner chamber can be used inflated to less than the pressure that would normally be required, e.g., to less than 70 psi pressure, in some cases less than 50 or even less than 30 psi. In some cases the tube can be inflated to any desired pressure from about 10 to 100 psi. The outer chamber can also be run at a wide variety of pressures, e.g., 0 to 80 psi, depending on the machine or vehicle. For example, possible operating ranges for motorcycle and bicycles are from about 0 to 20 psi. When used in off-road motorcycle applications, the outer chamber of the tire insert assembly could be inflated from about 0 to 12 psi. The pressure in either or both of the chambers can be changed by the user during use, e.g., to adjust performance to accommodate for changing surface conditions.

Referring to FIG. 4A, valve 14 communicates with inner chamber 21 and valve 15 communicates with outer chamber 11 via a tube assembly 48 and an outer chamber port 44, shown in detail in FIG. 4B. This dual valve system allows the user to adjust the relative pressures of the two chambers independently.

As seen in FIGS. 5A-D and 7A-F, the dual, independent valve system shown in FIG. 4A may be combined into a single inflation device 42. Inflation device 42 has two distinct ports: outer chamber port 44 and inner chamber port 46 which are selectively supplied with gas by a manifold assembly 47, which includes a manifold 64 (FIGS. 5C, 7B) and a tube assembly 48 in fluid communication with the manifold. The inflation devices shown in FIGS. 7A-F are similar to those shown in FIGS. 5A-D except that the conduits to outer chamber port 44 and inner chamber port 46 are disposed at 90 degrees to each other in FIGS. 5A-D and are in-line in FIGS. 7A-F. In both embodiments, the gas passes through a threaded valve stem 55 (FIG. 7A) and, depending on which chamber is selected for inflation (or deflation) by the user, passes through either the inner chamber port 46 and thus into the inner chamber 21, or through tube assembly 48 to the outer chamber port 44 and into the outer chamber 11. A standard valve core 53 (FIGS. 5D, 7B), e.g., a Schrader or Presta style valve core, is screwed into valve stem 55 to allow inflation with standard inflation devices, e.g. a pump. Valve cap 54 is configured to thread on to valve stem 55 thereby protecting valve core 53 from foreign debris contamination and preventing unintended chamber deflation.

Figure 5B:
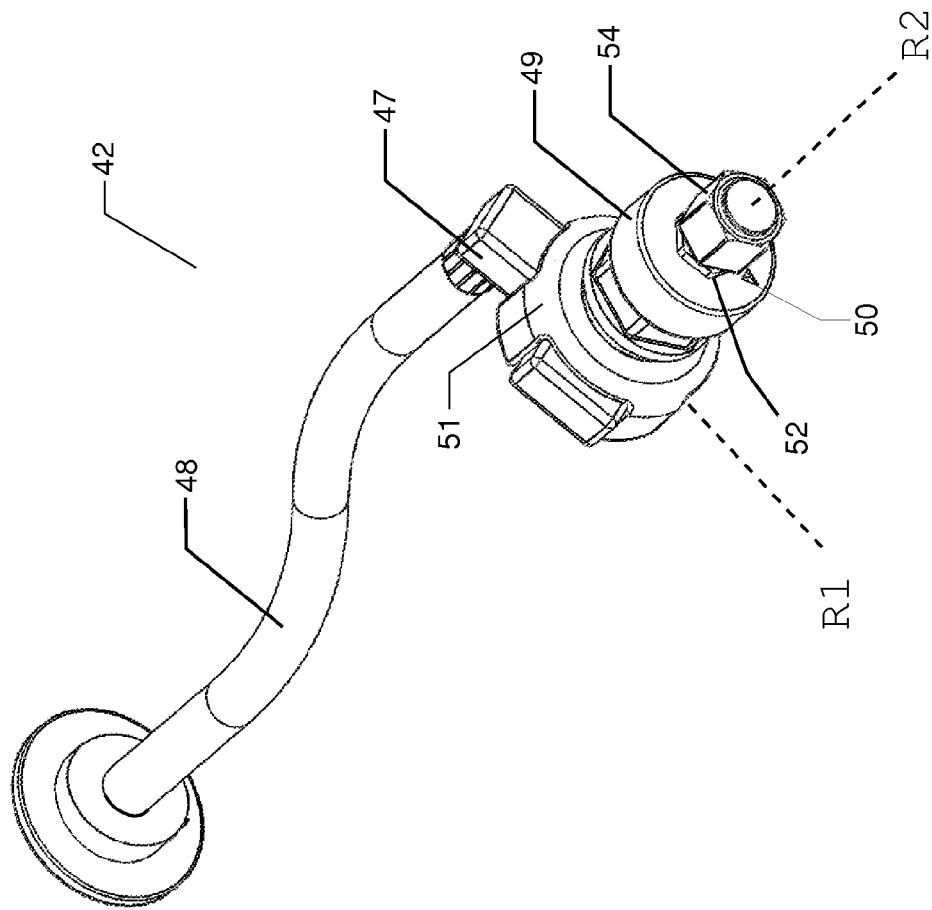
FIG. 5B is a perspective view of the manifold shown in FIG. 5A, taken from the opposite direction.
Figure 5C:
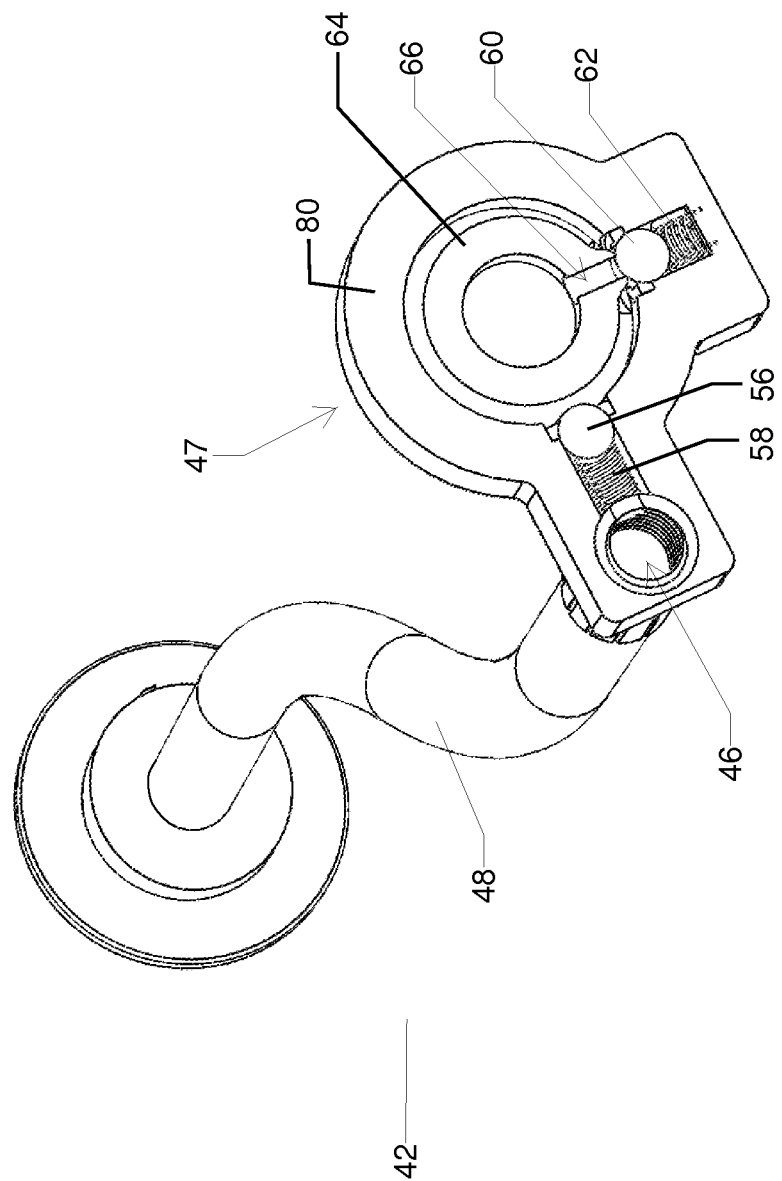
FIG. 5C is a cross-sectional view of the manifold shown in FIG. 5B taken at reference line R1 as seen in FIG. 5B.
Figure 5D:
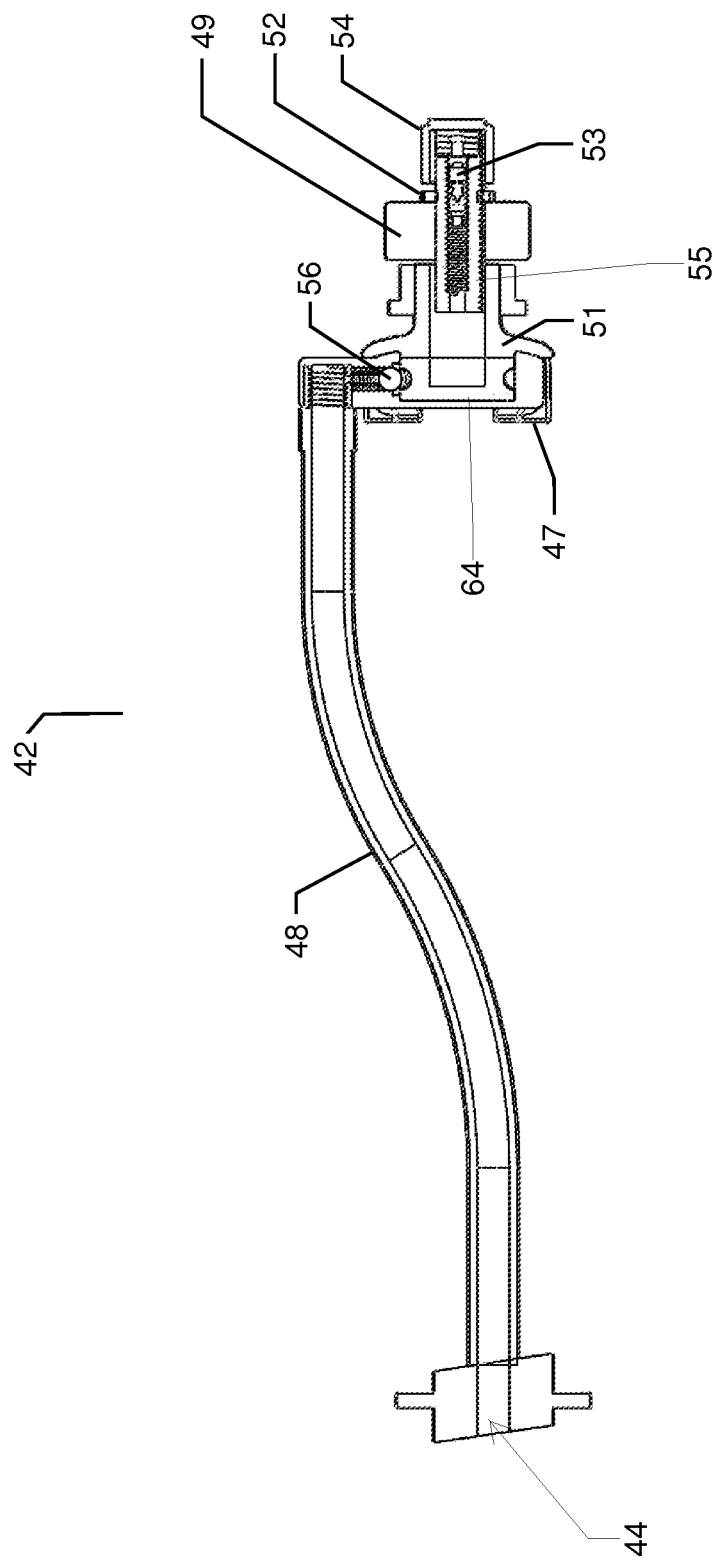
FIG. 5D is a cross-sectional view of the component taken at reference line R2 as seen in FIG. 5B.

To select the desired chamber, the user would rotate selector knob 49 to either a first position or a second position as indicated by arrow 50 which points to positions on an indicator label on the rim (not shown). The first position would grant access to the outer chamber and the second position would grant access to the inner chamber, as seen in FIGS. 5C and 7F.

Figure 7F:
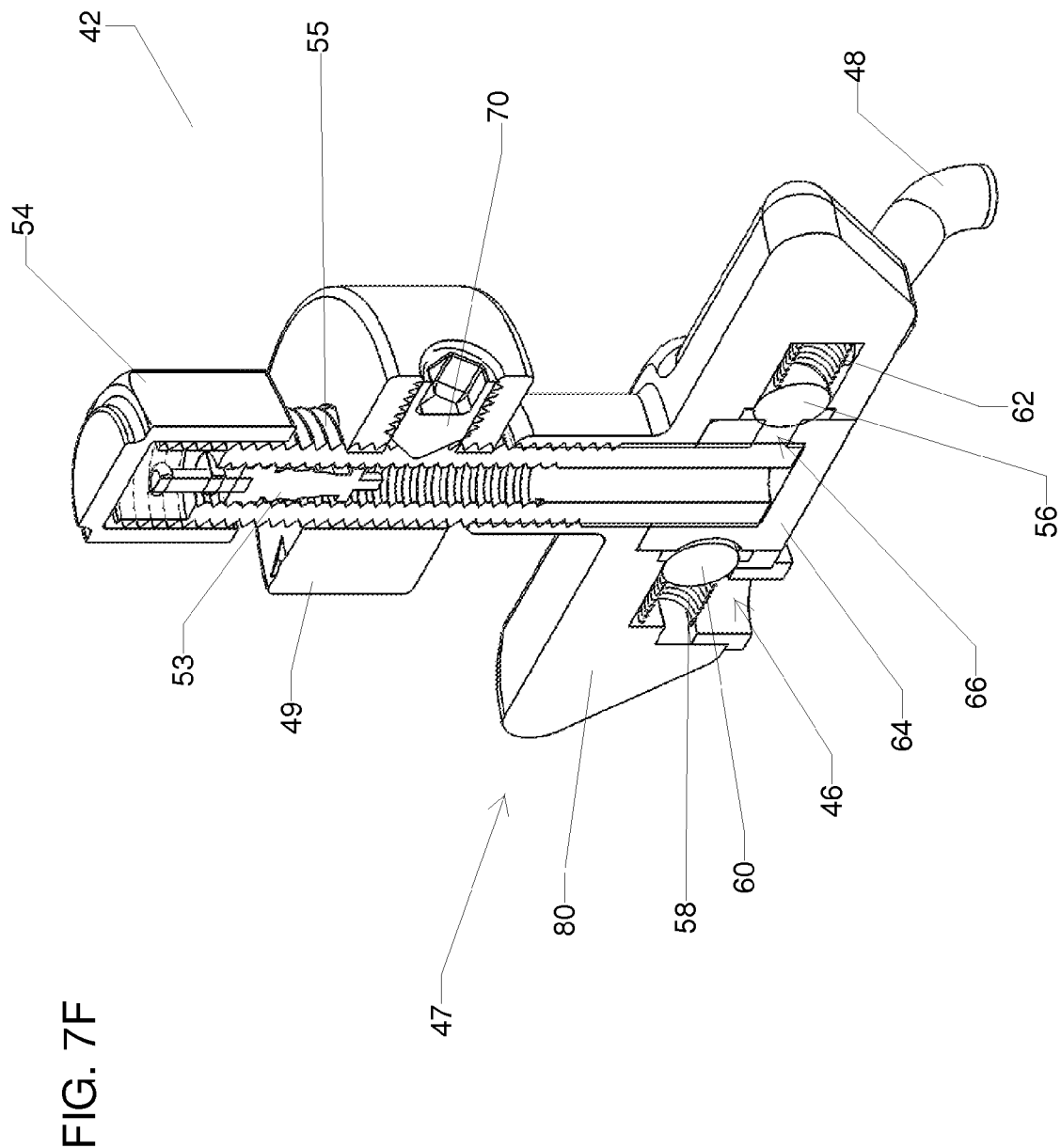
FIG. 7F is a cross-sectional view of the manifold taken at reference line R5 as seen in FIG. 7D.

Referring to FIG. 7F, selector knob 49 is configured with a setscrew 70 that when tightened impinges upon the valve stem 55. Selector knob 49 is shaped to fit on valve stem 55. Due to the impingement of setscrew 70 upon valve stem 55, the rotation of selector knob 49 in turn rotates valve stem 55 and thus manifold 64, which is mounted fixedly at the end of valve stem 55 within manifold housing 80. Manifold 64 has a port 66 that allows gas to communicate from the valve stem 55 through the manifold and to the selected port. Ball 56 and ball 60 are disposed within the manifold housing 80 and biased towards the manifold by spring 58 and spring 62 respectively. Balls 56 and 60 are configured to occlude ports 46 and 44 respectively in the manner of poppet valves. Poppet valves are well known in the art.

When aligned, port 66 is configured to interact with ball 56 and ball 60 so that the spring is compressed, thereby independently opening either port 44 or port 46. The manifold is configured to interact with only one ball and, therefore, one port at a time thereby sealing the other port.

In some embodiments, manifold 64 is an injection-molded piece, the tube assembly is adhered to the manifold, and the manifold assembly 47 is vulcanized as a stand-alone piece inside or outside of the insert, or vulcanized into the layup of the insert.

When a tube is used in the inner chamber, the tube is provided with a stem that is configured to be screwed into port 46 of the manifold by the user. When no inner tube is used, the inner chamber is simply inflated through the opening of port 46.

The inflation devices shown in FIGS. 7A-F can be used on rims with smaller rim bed areas or with rims with differently configured rim beds that would not allow for the inflation devices shown in FIGS. 5A-D to be used. Also, the inflation devices shown in FIGS. 7A-F can be vulcanized to/the inner tube whereas those shown in FIGS. 5A-D generally cannot.

Other Embodiments

A number of embodiments have been described. Nevertheless, it will be understood that various modifications may be made without departing from the spirit and scope of the disclosure.

For example, the tire insert assembly may be scaled to accommodate tires and tire systems of different sizes, and may be used in a wide variety of applications, e.g., mountain bike tires, motocross and motorcycle tires, ATV tires, automobile tires, industrial truck and equipment tires and military vehicle tires.

When the tire insert assembly 20 is used in sealed rim systems where the rim, valve and tire create an airtight chamber, the tire insert assembly is configured with a tubeless inner chamber. Such sealed rim systems are commonly used on all terrain vehicles, trucks, automobiles, tractors, agricultural equipment, etc. Alternatively, as shown in FIG. 7, the tire insert assembly may define a closed chamber such that no tube is necessary. Strip element 80 as seen in FIG. 3B, will be utilized between the insert outer wall and the tire inner sidewall when an additional element is required to segregate the inner and outer chamber tire pressures. Strip element 80 may be, for example, strips of butyl rubber or equivalent. The width of strip element 80 may range from 1 cm to 25 cm or more depending on the application and the type and size of tire being used.

Another embodiment may feature alternative elastomeric materials used in the outer chamber. These alternative materials would preferably have resilient and compliant characteristics and would be selected and configured based on their intended application. Suitable examples may include but are not restricted to Nitrogen-charged closed-cell foams, polychloroprene, and/or polyurethane based foams.

Another embodiment may feature a tire insert assembly with more or alternatively configured puncture resistant layers to guard against system failure due to violent penetration, for example, from a projectile or explosion.

Another embodiment may feature tire insert assemblies that are configured with different sidewall heights. These alternative configurations may protect more or less of the sidewall of the tire depending on the vehicle or machine application.

Another embodiment may feature a tire insert assembly that utilizes a heterogeneous liquid mixture, configured to provide ballast and self-healing capabilities in the event of puncture within one or both chambers.

Accordingly, other embodiments are within the scope of the following claims.

What is claimed is:

1. A tire insert assembly comprising:
   an elastomeric tire insert constructed to be received within a tire, the tire having sidewalls and a tread portion, an upper crown surface of the tire insert and an inner surface of the tire defining an outer chamber and the tire insert defining an inner chamber;
   wherein the tire insert has a multilayer construction, and makes contact with and supports the sidewalls of the tire for a distance that is at least 70% of the tire sidewall height, measured from the rim to the start of the tread portion when the inner chamber is inflated.

2. The tire insert assembly of claim 1 wherein the tire insert extends up to the tread portion of the tire.

3. The tire insert assembly of claim 1 wherein the tire insert assembly further comprises a tube disposed within the tire insert, and the tube defines the inner chamber.

4. The tire insert assembly of claim 1 wherein the tire insert includes a generally flat crown portion and sidewall portions extending from either edge of the generally flat crown portion.

5. The tire insert assembly of claim 1 wherein the tire insert includes non-elastomeric, puncture resistant elements.

6. The tire insert assembly of claim 5 wherein the tire insert includes a generally flat crown portion and the puncture resistant elements are disposed within the flat crown portion.

7. The tire insert assembly of claim 5 wherein the tire insert includes a generally flat crown portion and sidewall portions extending from either edge of the generally flat crown portion, and at least some of the puncture resistant elements extend down the sidewall portions.

8. The tire insert assembly of 5 wherein the tire insert includes a generally flat crown portion and the layup of the puncture resistant elements within the elastomeric tire insert defines the cross-sectional shape of the generally flat crown portion.

9. The tire insert assembly of claim 1 further comprising belts that extend around the outer surface of the tire insert and which are pre-formed to center the tire insert within a tire cavity defined by the tire and a rim on which the tire is mounted.

10. The tire insert assembly of claim 1 further comprising tabs that interact with a rim on which the tire insert assembly is mounted and/or a bead of the tire to center the tire insert within a tire cavity defined by the tire and a rim on which the tire is mounted.

11. The tire insert assembly of claim 1 further comprising a two chamber valve assembly configured to allow the inner chamber and outer chamber to be selectively inflated through a single valve stem.

12. The tire insert assembly of claim 1 further comprising a foam element disposed in the outer chamber.

13. A tire insert assembly comprising:
    an elastomeric tire insert constructed to be received within a tire, the tire having sidewalls and a tread portion, an upper surface of the tire insert and an inner surface of the tire defining an outer chamber and the tire insert defining an inner chamber;
    wherein the tire insert has side walls and a generally flat crown portion configured to support the tire by contacting the sidewalls of the tire for a distance that is at least 70% of the tire sidewall height, measured from the rim to the start of the tread portion when the inner chamber is inflated and the pressure in the outer chamber is 0 to 20 PSI.

14. The tire insert assembly of claim 13 wherein the tire insert extends up to the tread portion of the tire.

15. The tire insert assembly of claim 13 wherein the tire insert assembly further comprises a tube disposed within the tire insert, and the tube defines the inner chamber.

16. The tire insert assembly of claim 13 further comprising belts that extend around the outer surface of the tire insert and which are pre-formed to center the tire insert within a tire cavity defined by the tire and a rim on which the tire is mounted.

17. The tire insert assembly of claim 13 further comprising tabs that interact with a rim on which the tire insert assembly is mounted and/or a bead of the tire to center the tire insert within a tire cavity defined by the tire and a rim on which the tire is mounted.

18. The tire insert assembly of claim 13 further comprising a two chamber valve assembly configured to allow the inner chamber and outer chamber to be selectively inflated through a single valve stem.

19. The tire insert assembly of claim 13 further comprising a foam element disposed in the outer chamber.

* * * * *